(12) United States Patent
Takazawa et al.

(10) Patent No.: US 6,930,307 B2
(45) Date of Patent: Aug. 16, 2005

(54) METHOD OF PRODUCTION, METHOD OF INSPECTION, AND METHOD OF USE OF SCANNING PROBE MICROSCOPE PROBE

(75) Inventors: Nobuaki Takazawa, Susono (JP); Ryuji Shimazaki, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/787,228

(22) Filed: Feb. 27, 2004

(65) Prior Publication Data

US 2004/0173744 A1 Sep. 9, 2004

(30) Foreign Application Priority Data

Mar. 6, 2003 (JP) ........................................ 2003-060157

(51) Int. Cl.[7] .......................... G01N 13/16; G01B 5/28
(52) U.S. Cl. ......................... 250/307; 250/306; 73/105
(58) Field of Search ................................ 250/306, 307; 73/105

(56) References Cited

U.S. PATENT DOCUMENTS 6,727,720 B2 * 4/2004 Houge et al. ................ 324/761

FOREIGN PATENT DOCUMENTS

JP        A 2000-227435         8/2000

* cited by examiner

*Primary Examiner*—Nikita Wells
(74) *Attorney, Agent, or Firm*—Oliff & Berridge, PLC (57) ABSTRACT

A method of production of a scanning probe microscope probe provided with a sharp head made of a single wall carbon nanotube comprising imparting a catalyst metal to a tip of probe body, then irradiating the catalyzed part of the tip of the probe body by an arc discharge caused between needle shaped carbon electrodes in an inert gas atmosphere in a scanning probe microscope so as to grow a single wall carbon nanotube at the catalyzed part, and a method of inspection and method of use of the same.

17 Claims, 7 Drawing Sheets

METHOD OF PRODUCTION, METHOD OF INSPECTION, AND METHOD OF USE OF SCANNING PROBE MICROSCOPE PROBE

BACKGROUND OF THE INVENTION

1. Field of the Invention

The present invention relates to a method of production, method of inspection, and method of use of a scanning probe microscope probe provided with a sharp head made of a single wall carbon nanotube (SWCNT).

2. Description of the Related Art

A scanning probe microscope (SPM) is a microscope which observes the surface of a sample by scanning by a probe having a sharp tip. It does not require a vacuum like an electron microscope such as an atomic force microscope (AFM) and enables observation of the surface of materials on the nanometer order in various environments (gases and liquids). Therefore, it is becoming an important tool for the development of various new materials such as bio related materials, catalyst materials, and semiconductor materials.

The dimensions of the tip of the probe are directly related to the resolution, so the tip is made from silicon (Si) or silicon nitride ($Si_3N4$) able to be microprocessed by a semiconductor process. Even so, even at the sharpest, the radius of the tip is about 5 nm. In general, it is over 10 nm. Further, the open angle of the tip is several tens of degrees or more, so deep relief patterns on the sample surface cannot be faithfully reproduced.

Therefore, to obtain a higher resolution, Japanese Unexamined Patent Publication (Kokai) No. 2000-227435 (paragraphs [0042] to [0043]) proposes to use a carbon nanotube (CNT) as the probe.

A carbon nanotube has superior features as a probe such as 1) a small radius of the tip (radius of as small as about 1 nm) and therefore a higher possible resolution in the horizontal direction, 2) a large possible aspect ratio and therefore the ability to faithfully reproduce deep relief patterns, and 3) a higher elasticity compared with conventional probe materials such as silicon and silicon nitride and therefore no damage even if striking the sample, a greater durability, and a longer service life.

In the proposal of Japanese Unexamined Patent Publication (Kokai) No. 2000-227435, a multiwall carbon nanotube (MWCNT) fabricated in advance is attached to the tip of a probe body and secured by a carbon film under observation under a scan electron microscope so as to fabricate a scanning probe microscope probe provided with a sharp head made of a multiwall carbon nanotube.

Figure 1A:
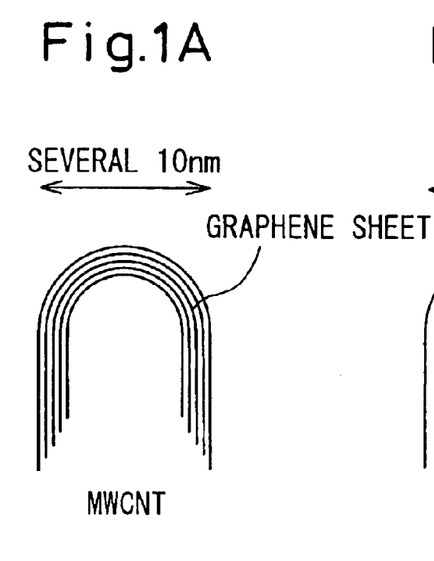
FIGS. 1A and 1B are cross-sectional views schematically showing a comparison of the laminar structure and general dimensions of a multiwall carbon nanotube (MWCNT) and a single wall carbon nanotube (SWCNT), respectively.
Figure 1B:
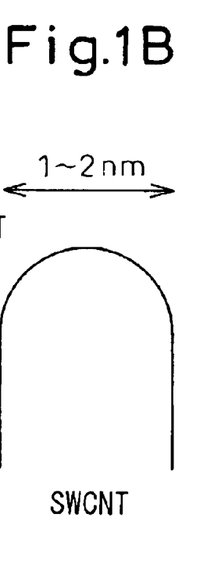

Since an attachment operation under observation by a scan electron microscope was required, from the viewpoint of the observability and handling strength, application of the above proposal required a carbon nanotube of a size of a diameter on the order of 10 nm (FIG. 1A). Therefore, while application to a multiwall carbon nanotube was possible, application to a single wall carbon nanotube (SWCNT) having a diameter of 1 nm or less (FIG. 1B) was not.

SUMMARY OF THE INVENTION

An object of the present invention is to provide a method of production, a method of inspection, and a method of use of a scanning probe microscope probe provided with a sharp head made of a single wall carbon nanotube.

To attain the above object, according to a first aspect of the present invention, there is provided a method of production of a scanning probe microscope probe provided with a sharp head made of a single wall carbon nanotube, the method comprising imparting a catalyst metal to a tip of a probe body, then irradiating the catalyzed part of the tip of the probe body by an arc discharge caused across fine needle shaped carbon electrodes in an inert gas atmosphere in the scanning probe microscope so as to cause growth of a single wall carbon nanotube at the catalyzed part.

Preferably, an anode electrode of the fine needle shaped carbon electrodes contains a catalyst metal.

It is possible to use the single wall carbon nanotube in the middle of growth at the tip of the probe body to scan a nanometer order step difference on a sample surface, find a length of the single wall carbon nanotube based on a sharpness of an obtained step difference image, and stop the arc discharge to stop growth of the single wall carbon nanotube when reaching a required length.

Preferably, the sample with a step difference is held on a forced cooling stage.

According to a second aspect of the invention, there is provided a method of production of a scanning probe microscope probe provided with a sharp head made of a single wall carbon nanotube, the method comprising imparting a catalyst metal to a tip of a probe body, then alternately irradiating the catalyzed part of the tip of the probe body by an arc discharge caused across fine needle shaped carbon electrodes and a laser beam while rotating it at a high speed about an axis perpendicular to its length direction in an inert atmosphere so as to grow a single wall carbon nanotube at the catalyzed part at the time of irradiation by arc discharge and sequentially monitor growth of the single wall carbon nanotube by Raman spectroscopy at the time of irradiation by the laser beam.

It is possible to blow a small amount of oxidizing gas to the single wall carbon nanotube being grown at the time of irradiation by the arc discharge so as to burn off a tip cap of the single wall carbon nanotube for further sharpening.

The oxidizing gas includes at least one type of gas selected from $CO_2$, $CO$, $H_2O$, $H_2O_2$, and $CH_3OH$.

According to a third aspect of the invention, there is provided a method of inspection of a probe produced by the first or second aspects of the invention comprising using a probe to scan a nanometer order step difference on a sample surface and finding a bearing of growth of the single wall carbon nanotube forming the sharp head of the probe based on an angle and bearing of deviation of the obtained step difference image from the actual shape.

Further, according to a fourth aspect of the invention, there is provided a method of use of a probe for which a bearing of growth of the single wall carbon nanotube is found by the above method of inspection comprising tilting a sample stage in accordance with the bearing of growth so as to make a direction of the probe sharp head made of the single wall carbon nanotube perpendicularly intersect with the sample surface.

In the above method of use, it is possible to tilt the sample stage by three actuators able to be independently controlled.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

First Embodiment

Figure 2:
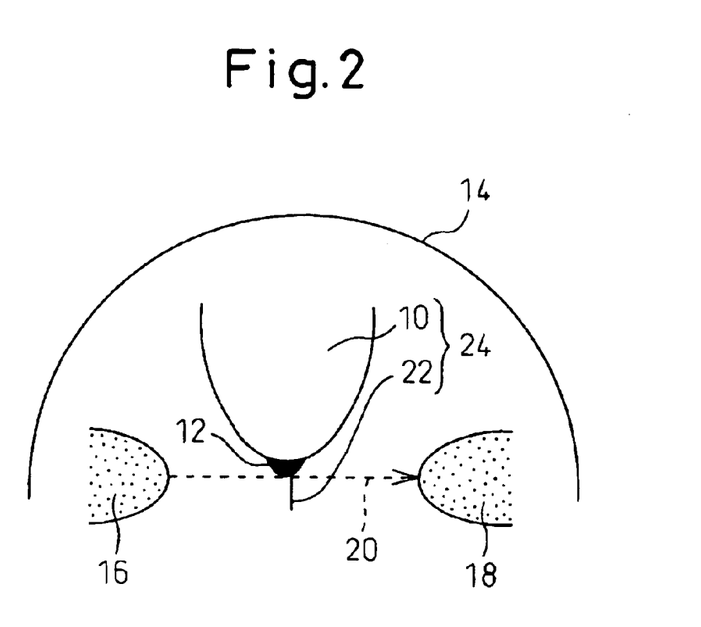
FIG. 2 is a cross-sectional view schematically showing an example of the configuration of an apparatus for producing a scanning probe microscope probe provided with a sharp head made of a single wall carbon nanotube according to a first aspect of the invention.

FIG. 2 schematically shows an example of the configuration of an apparatus for producing a scanning probe microscope probe provided with a sharp head made of a single wall carbon nanotube according to a first aspect of the invention.

A catalyst metal 12 is deposited on the tip of a probe body 10. This catalyst metal may be deposited in the scanning probe microscope or a probe body given the catalyst metal in advance may be attached in the scanning probe microscope.

The carbon nanotube is produced in the present invention by a conventionally known method using an arc discharge using a catalyst metal. In the illustrated example of the configuration, a fine needle shaped carbon anode electrode 16 and cathode electrode 18 are arranged facing each other in a chamber 14 of an Ar, $N_2$, or other inert gas atmosphere and an arc discharge 20 is caused across the electrodes. Due to the heat emitted by the arc discharge, carbon evaporates from the carbon electrodes 16 and 18 into the atmosphere. If irradiating the part of the tip of the probe body 10 imparted with the catalyst metal 12 by the arc discharge 20, a carbon nanotube 22 will be produced at the part imparted with the catalyst metal 12. To selectively grow a single wall carbon nanotube, it is sufficient to suitably employ a means such as control of the arc discharge 20 or imparting a catalyst metal to the anode 16. Due to this, a scanning probe microscope probe 24 comprised of the probe body 10 provided at its tip with a sharp head made of a single wall carbon nanotube is obtained.

In the past, a separately produced carbon nanotube was attached to the tip of a probe body under observation by a scanning electron microscope, so from the viewpoints of the observability and handling strength, the range of application was limited to only multiwall carbon nanotubes of diameters of several tens of nanometers. It was not possible to produce a probe provided with a single wall carbon nanotube at the tip.

The present invention eliminates this limitation of the related art by directly growing a carbon nanotube on the tip of the probe body and enables production of a probe provided with a sharp head made of a single wall carbon nanotube.

Figure 3A:
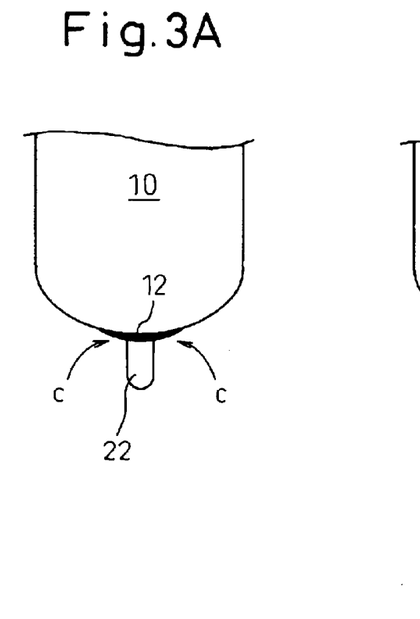
FIGS. 3A and 3B are cross-sectional views schematically showing the principle of growth of a single wall carbon nanotube according to the present invention.
Figure 3B:
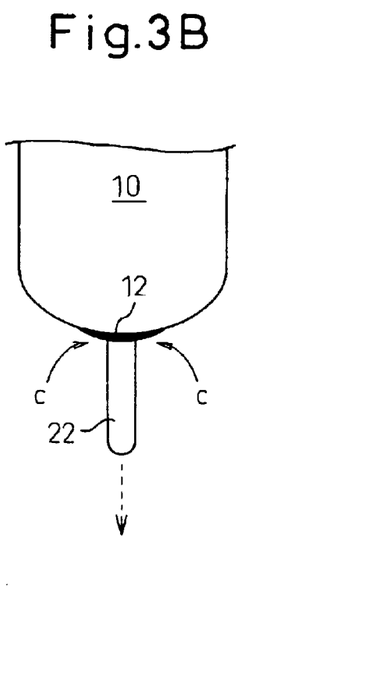

In the method of production of the present invention, as shown in FIG. 3A, the carbon evaporated from the carbon electrodes due to the arc discharge is used as the material for forming a single wall carbon nanotube 22 preferentially at the tip of the probe body 10 given the catalyst metal 12. To selectively grow only a single wall carbon nanotube 22, means such as control of the arc discharge or imparting catalyst metal in the anode is suitably employed. Further, as shown in FIG. 3B, since the single wall carbon nanotube is selectively formed only at the part where the catalyst metal is imparted, that is, the base of the produced carbon nanotube, the single wall carbon nanotube grows straight as shown by the downward facing arrow in the figure.

As the catalyst metal, a metal promoting growth of a carbon nanotube by an arc discharge is suitable. While not particularly limited, in general iron, cobalt, nickel, etc. is used.

To preferentially grow a single wall carbon nanotube, it is preferable to fabricate the anode 16 as a composite material of carbon and the above catalyst metal.

As the probe body 10, a conventional probe may be used or one may be fabricated by silicon or silicon nitride.

Second Embodiment

Figure 4:
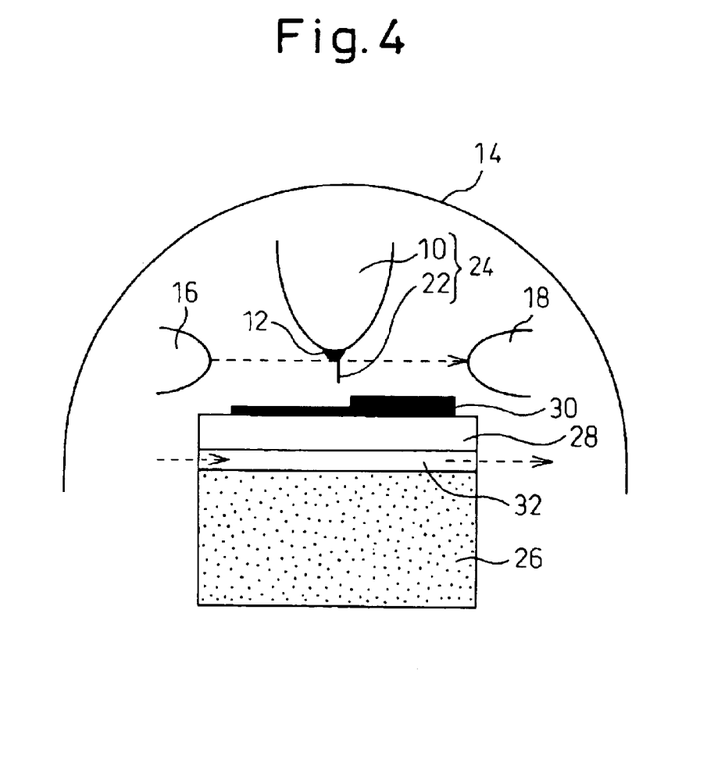
FIG. 4 is a cross-sectional view schematically showing another embodiment of a method of production of a probe according to the first aspect of the present invention.

FIG. 4 shows another embodiment of a method of production of a probe according to the first aspect of the invention. In this embodiment, in addition to the configuration of the first embodiment, a detection substrate 30 having a nanometer order step difference on its surface is attached to a sample stage 28 provided on a piezoelectric device 26 serving as an actuator. As such a step difference, for example, a nanostep appearing on the clean surface of an Si substrate is suitable. This is used to sequentially monitor the growth of the carbon nanotube being grown as follows.

Figure 5A:
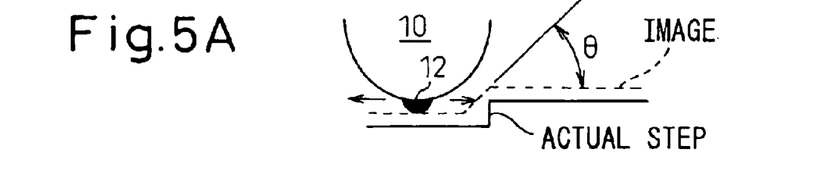
FIGS. 5A and 5B are cross-sectional views comparing the relationship between an actual step difference of a sample and its image at points before growth of a single wall carbon nanotube (FIG. 5A) and a point after growth (FIG. 5B) according to the embodiment of FIG. 4.
Figure 5B:
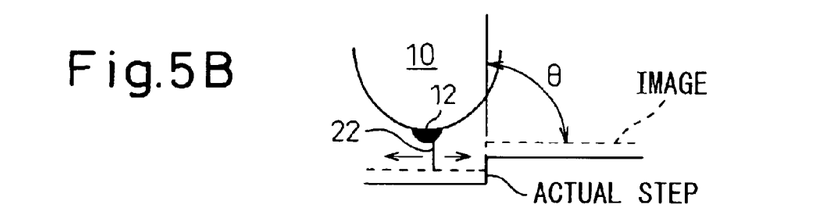

That is, when the carbon nanotube is not yet grown or is short, as shown in FIG. 5A, the radius of curvature of the tip of the probe body is several tens of nm, so it is not possible to faithfully reproduce a nanometer order (1 nm or less) step difference. Even if the actual step difference is cut perpendicularly, the image of the step difference is observed as a slanted step difference of an angle θ. As opposed to this, as shown in FIG. 5B, if the single wall carbon nanotube grows and forms a sharp head serving as the de facto probe without being affected by the radius of curvature of the probe body, the perpendicularly cut actual step difference will be faithfully reproduced, so the step difference image will also be observed as a perpendicular step difference of an angle θ of 90°. By stopping the arc discharge to stop the growth of the single wall carbon nanotube at the time when the actual step difference is converted to a faithful image in this way, it is possible to obtain a probe provided with a sharp head made of a single wall carbon nanotube of a suitable aspect ratio, that is, a required length.

Note that it is also possible to circulate liquid nitrogen or another refrigerant in a refrigerant circulation path 32 passing through the assembly comprised of the stage 28 and piezoelectric device 26 to enable stable observation by the scanning probe microscope under the arc discharge.

Third Embodiment

Figure 6:
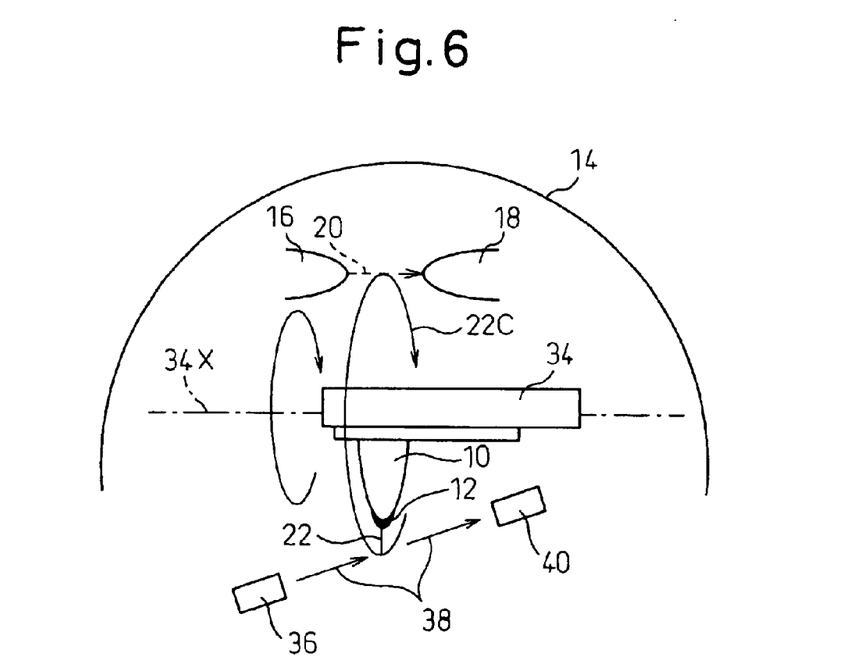
FIG. 6 is a cross-sectional view schematically showing an example of the configuration of an apparatus for producing a scanning probe microscope probe provided with a sharp head made of a single wall carbon nanotube according to a second aspect of the invention.

FIG. 6 schematically shows an example of the configuration of an apparatus for producing a scanning probe microscope probe provided with a sharp head made of a single wall carbon nanotube according to a second aspect of the invention.

First, the configuration arranging a fine needle shaped carbon anode electrode 16 and cathode electrode 18 facing each other in a chamber 14 made an Ar, $N_2$, or other inert gas atmosphere and causing an arc discharge 20 across the electrodes is the same as in the first and second embodiments.

However, in the present embodiment, the probe body 10 is secured to a rotating holder 34 and made to rotate at a high speed of for example 1000 to 20000 rpm around a shaft 34 perpendicular to the length direction of the probe body 10. The rotational path 22C of the catalyzed part 12 of the probe body 10 criss-crosses the arch discharge 20 across the fine needle shaped carbon electrodes 16 and 18 and the laser beam 38 emitted from a laser source 36. A Raman spectroscope 40 is arranged at the opposite side from the rotational path 20 from the laser source 36.

The catalyzed part 12 of the probe body 10 is alternately irradiated by the arc discharge 20 and the laser beam 38. At the time of irradiation by arc discharge, the single wall carbon nanotube is grown at the catalyzed part 12, while at the time of irradiation by the laser beam, the growth of the single wall carbon nanotube is sequentially monitored by Raman spectroscopy.

Figure 7:
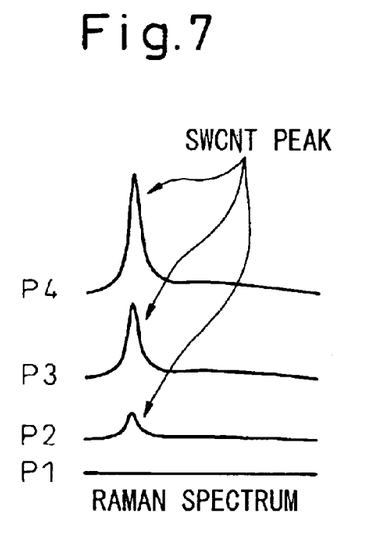
FIG. 7 is a schematic view of a Raman spectrum chart showing changes over time P1 to P4 of a Raman peak of a single wall carbon nanotube grown by the apparatus of FIG. 6.

According to the configuration of the present embodiment, the centrifugal force acting in the longitudinal direction of the probe body 10 due to the high speed rotation promotes linear growth of the single wall carbon nanotube. Further, the growth of the single wall carbon nanotube due to arc discharge is sequentially monitored by Raman spectroscopy by laser beam irradiation. That is, as shown by P1 to P4 in FIG. 7, the Raman peak strength increases along with growth of the single wall carbon nanotube. Further, while not clearly shown in the figure, a shift in the Raman peak position etc. occur along with growth. Therefore, if calibrating the relationship among the length of the single wall carbon nanotube in the middle of growth and strength of the Raman peak, position shifts, and other properties in advance, it is possible to determine the length of the single wall carbon nanotube actually being grown from the values of the properties of the Raman peak. Further, if stopping the arc discharge at the time when the various properties of the Raman peak become desired values, a single wall carbon nanotube of a predetermined length will be obtained.

In this way, according to the present invention, it is possible to improve the controllability in particular in the growth bearing and possible to obtain a single wall carbon nanotube at a desired length.

Fourth Embodiment

Figure 8:
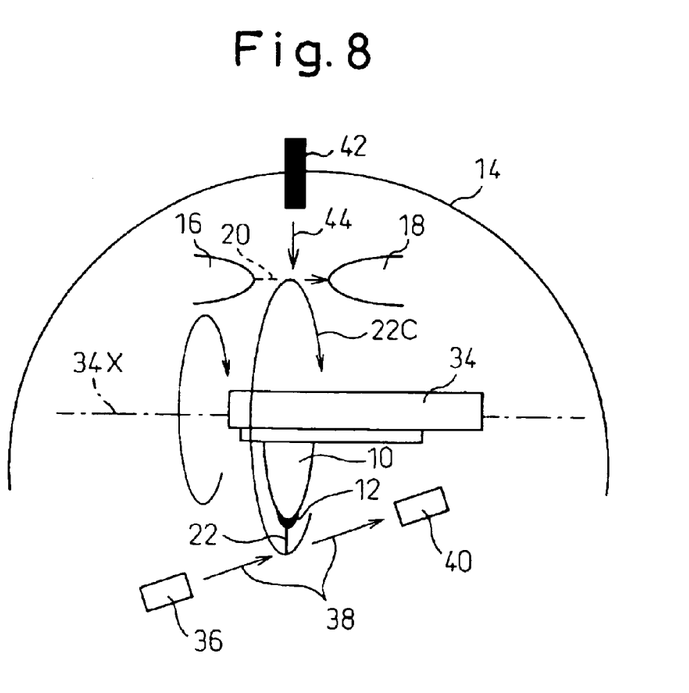
FIG. 8 is a cross-sectional view schematically showing an embodiment further adding an oxidizing gas blowing function to the hardware configuration of FIG. 6.

FIG. 8 shows another embodiment of a method of production of a probe according to the second aspect of the invention. In the present embodiment, in addition to the configuration of the third embodiment, a small amount of an oxidizing gas 44 is blown from a nozzle 42 at the time of the arc discharge.

The single wall carbon nanotube is formed at its side surfaces by stable six-member ring carbon graphite, but its tip cap includes unstable five-member ring carbon since it is closed semispherically. Therefore, if oxidizing gas is blown, the carbon of the unstable tip cap five-member ring part will be attacked and oxidation damage will start.

As the oxidizing gas, a compound containing oxygen among its component elements such as $CO_2$, CO, $H_2O$, $H_2O_2$, or $CH_3OH$, that is, a gas weaker in oxidizing strength compared with oxygen gas $O_2$, is preferable. $O_2$ may also be used in a small amount, but since its oxidizing strength is high, even the side surfaces of the carbon nanotube are liable to be attacked. It is important that the side surfaces not be burned and that only the tip cap be selectively burned.

Figure 9A:
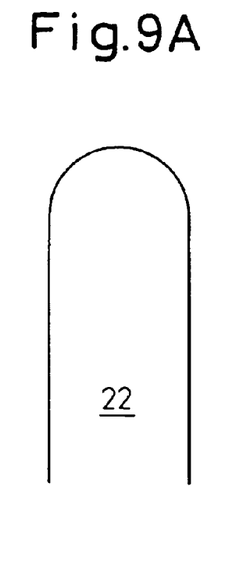
FIGS. 9A and 9B are perspective views schematically showing a single wall carbon nanotube having a tip cap and a single wall carbon nanotube from which the tip cap is cut off using the apparatus of FIG. 8, respectively.
Figure 9B:
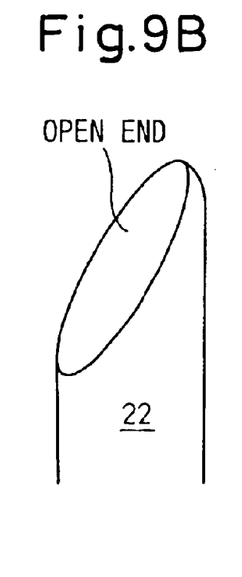
Figure 10:
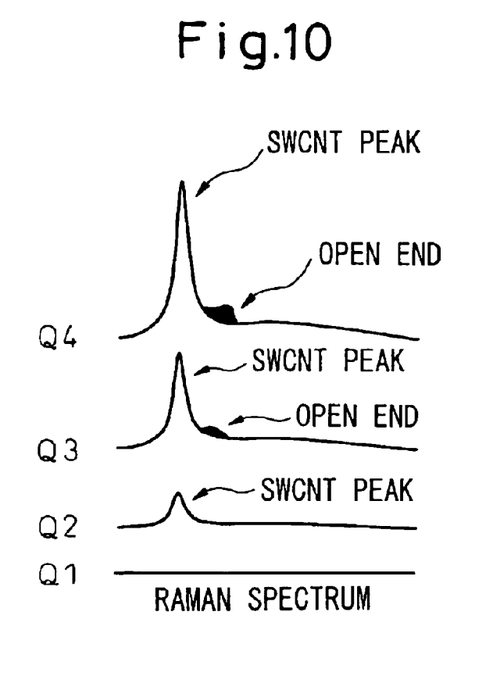
FIG. 10 is a schematic view of a Raman spectrum chart showing changes over time Q1 to Q4 of a Raman peak in the case of cutting off the tip cap by the apparatus of FIG. 8.

Due to the heat of the arc discharge, the tip cap (FIG. 9A) of the single wall carbon nanotube 22 being grown is burnt off for further sharpening the tip (FIG. 9B). The progress of this sharpening can be observed by the Raman spectrum as shown by Q1 to Q4 in FIG. 10A. When the desired sharpening is detected by the Raman spectrum, the arc discharge and the blowing of the oxidizing gas are stopped and the growth of the single wall carbon nanotube is ended.

According to the present embodiment, it is possible to make the tip cap of a single wall carbon nanotube even sharper and possible to obtain an even higher resolution.

Fifth Embodiment

An embodiment of a method of inspection, according to a third aspect of the invention, of a scanning probe microscope probe produced by the first and second aspects of the invention will be explained with reference to FIGS. 11A, 11B, and 11C.

Figure 11A:
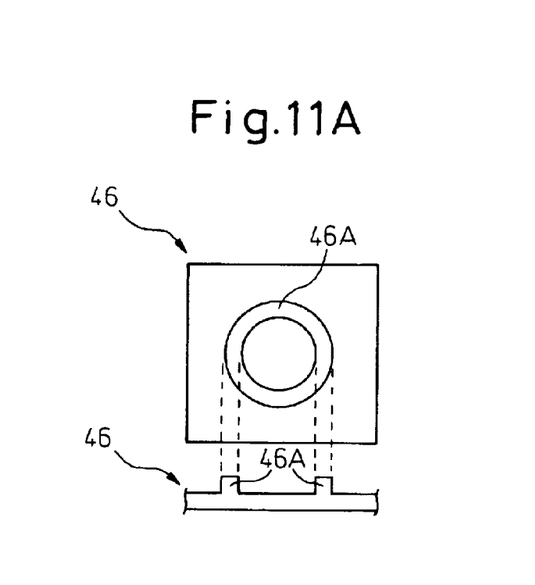
FIGS. 11A, 11B, and 11C are a plan view and sectional view of an inspection substrate formed with a nanometer order step difference, a cross-sectional view showing the relationship between an actual step difference and its image in the lateral sectional profile, and a plan view showing the relationship between an actual step difference and its image for the planar shape, respectively, in the method of inspection of an angle and bearing of slant of a single wall carbon nanotube probe according to a third aspect of the invention.

As shown by the plan view and cross-sectional view of FIG. 11A, an inspection substrate 46 formed with a nanometer order circular step difference 46A on its surface is observed by a scanning probe microscope using the produced probe.

Figure 11B:
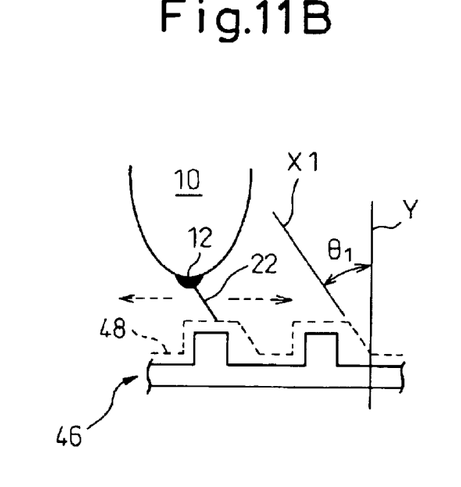

In this example, as shown by the cross-sectional view of FIG. 11B, the vertical plane projection component X1 of the longitudinal axis of the single wall carbon nanotube 22 grown at the catalyst metal imparted part 12 of the probe body 10 is slanted by an angle θ1 with respect to the vertical reference line Y (longitudinal axis direction of probe body 10). If scanning in the arrow direction using this single wall carbon nanotube 22 as a probe, the cross-sectional profile image 48 of the inspection substrate 46 will be displayed as illustrated. Here, the step difference image is displayed as a slanted surface as illustrated due to the slanting of the probe 22 despite the side surface of the actual step difference 46A being cut perpendicularly.

Figure 11C:
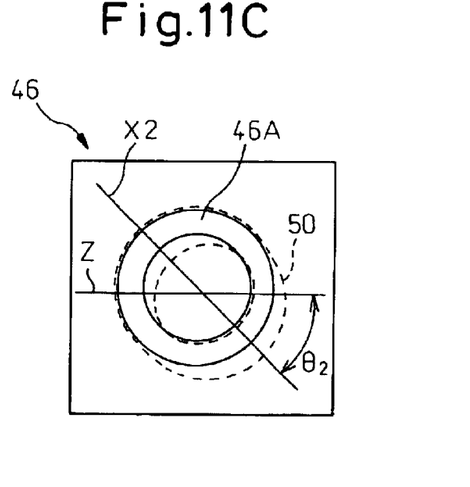

Further, as shown by the plan view in FIG. 11C, the horizontal plane projection component X2 in the longitudinal direction of the single wall carbon nanotube 22 is slanted by an angle θ2 with respect to a horizontal reference line Z. Therefore, the planar image 50 of the circular step difference 46A, as illustrated, is displayed shifted to the bottom right from the actual position by an angle θ2 in the figure.

It is possible to find the angle and bearing of three-dimensional deviation of the single wall carbon nanotube with respect to the longitudinal axis of the probe body 10 from the above obtained slant angle θ1 in the vertical plane and the slant angle θ2 in the horizontal plan.

According to the present embodiment, it is possible to inspect for slant of a single wall carbon nanotube grown at the tip of a probe body 10 with respect to the probe body 10. Further, based on the slant (angle and bearing) found by the inspection, it becomes possible to use even a slanted nanotube as a probe by the method of use explained in the next embodiment.

Sixth Embodiment

An embodiment of a method of use of a single wall carbon nanotube inspected by the third aspect of the invention as a probe in an actual scanning probe microscope according to a fourth aspect of the invention will be explained referring to FIGS. 12A and 12B.

Figure 12A:
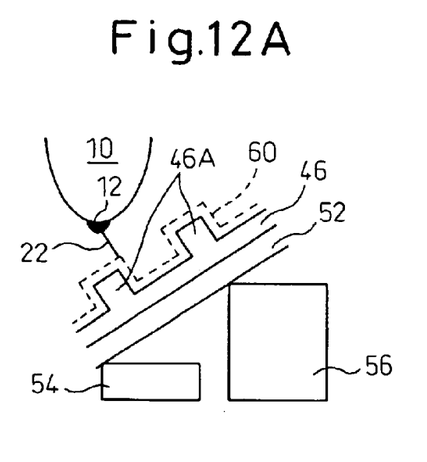
FIGS. 12A and 12B are a cross-sectional view of the state of tilting of a sample stage and a plan view of three actuators for tilting the sample stage in a method of use of a slanted single wall carbon nanotube probe in an actual scanning probe microscope according to a fourth aspect of the invention.

As shown by the cross-sectional view in FIG. 12A, by tilting a sample stage 52 to correspond to the angle and bearing of the slant of a single wall carbon nanotube probe 22, the single wall carbon nanotube probe 22 is made to perpendicularly intersect the plane of the stage 52 (sample surface). Due to this, an image 60 is obtained faithfully reproducing an actual step difference 46A.

Figure 12B:
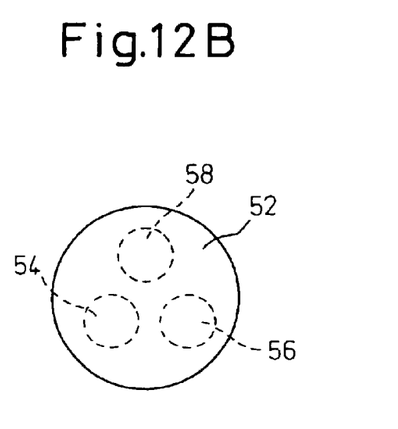

Such a tilting operation of the stage 52 can be performed by three actuators 54, 56, and 58 able to be independently controlled as shown in the plane view of FIG. 12BA. As actuators, piezoelectric devices enabling displacement on the nanometer order are suitable.

According to the present embodiment, it is possible to use even a slanted single wall carbon nanotube probe for an actual scanning probe microscope, so there is an advantage equal to actually raising the production yield of single wall carbon nanotubes.

Summarizing the effects of the invention, according to the present invention, there are provided a method of production, a method of inspection, and a method of use of a scanning probe microscope probe provided with a sharp head made of a single wall carbon nanotube.

While the invention has been described with reference to specific embodiments chosen for purpose of illustration, it should be apparent that numerous modifications could be made thereto by those skilled in the art without departing from the basic concept and scope of the invention.

What is claimed is:

1. A method of production of a scanning probe microscope probe provided with a sharp head made of a single wall carbon nanotube, said method comprising imparting a catalyst metal to a tip of a probe body, then irradiating the catalyzed part of the tip of the probe body by an arc discharge caused across fine needle shaped carbon electrodes in an inert gas atmosphere in the scanning probe microscope so as to cause growth of a single wall carbon nanotube at said catalyzed part.

2. A method of production as set forth in claim 1, wherein an anode of said fine needle shaped carbon electrodes contains a catalyst metal.

3. A method of inspection of a probe produced by a method as set forth in claim 2, comprising using said probe to scan a nanometer order step difference on a sample surface and finding a bearing of growth of the single wall carbon nanotube forming the sharp head of said probe based on an angle and bearing of deviation of the obtained step difference image from the actual shape.

4. A method of production as set forth in claim 2, further comprising using the single wall carbon nanotube in the middle of growth at the tip of said probe body to scan a nanometer order step difference on a sample surface, finding a length of said single wall carbon nanotube based on a sharpness of an obtained step difference image, and stopping said arc discharge to stop growth of said single wall carbon nanotube when reaching a required length.

5. A method of production as set forth in claim 1, further comprising using the single wall carbon nanotube in the middle of growth at the tip of said probe body to scan a nanometer order step difference on a sample surface, finding a length of said single wall carbon nanotube based on a sharpness of an obtained step difference image, and stopping said arc discharge to stop growth of said single wall carbon nanotube when reaching a required length.

6. A method of production as set forth in claim 5, further comprising holding said sample with a step difference on a forced cooling stage.

7. A method of inspection of a probe produced by a method as set forth in claim 6, comprising using said probe to scan a nanometer order step difference on a sample surface and finding a bearing of growth of the single wall carbon nanotube forming the sharp head of said probe based on an angle and bearing of deviation of the obtained step difference image from the actual shape.

8. A method of inspection of a probe produced by a method as set forth in claim 5, comprising using said probe to scan a nanometer order step difference on a sample surface and finding a bearing of growth of the single wall carbon nanotube forming the sharp head of said probe based on an angle and bearing of deviation of the obtained step difference image from the actual shape.

9. A method of inspection of a probe produced by a method as set forth in claim 1, comprising using said probe to scan a nanometer order step difference on a sample surface and finding a bearing of growth of the single wall carbon nanotube forming the sharp head of said probe based on an angle and bearing of deviation of the obtained step difference image from the actual shape.

10. A method of use of a probe for which a bearing of growth of the single wall carbon nanotube is found by the method of inspection of claim 9 in a scanning probe microscope, said method comprising tilting a sample stage in accordance with said bearing of growth so as to make a direction of the probe sharp head made of the single wall carbon nanotube perpendicularly intersect with the sample surface.

11. A method of use as set forth in claim 10, further comprising tilting said sample stage by three actuators able to be independently controlled.

12. A method of production of a scanning probe microscope probe provided with a sharp head made of a single wall carbon nanotube, said method comprising imparting a catalyst metal to a tip of a probe body, then alternately irradiating the catalyzed part of the tip of said probe body by an arc discharge caused across fine needle shaped carbon electrodes and a laser beam while rotating it at a high speed about an axis perpendicular to its length direction in an inert atmosphere so as to grow a single wall carbon nanotube at said catalyzed part at the time of irradiation by arc discharge and sequentially monitor growth of the single wall carbon nanotube by Raman spectroscopy at the time of irradiation by the laser beam.

13. A method of production as set forth in claim 12, further comprising blowing a small amount of oxidizing gas to the single wall carbon nanotube being grown at the time of irradiation by said arc discharge so as to burn off a tip cap of said single wall carbon nanotube for further sharpening.

14. A method of inspection of a probe produced by a method as set forth in claim 13, comprising using said probe to scan a nanometer order step difference on a sample surface and finding a bearing of growth of the single wall carbon nanotube forming the sharp head of said probe based on an angle and bearing of deviation of the obtained step difference image from the actual shape.

15. A method of production as set forth in claim 13, wherein said oxidizing gas includes at least one type of gas selected from $CO_2$, $CO$, $H_2O$, $H_2O_2$, and $CH_3OH$.

16. A method of inspection of a probe produced by a method as set forth in claim 15, comprising using said probe to scan a nanometer order step difference on a sample surface and finding a bearing of growth of the single wall carbon nanotube forming the sharp head of said probe based on an angle and bearing of deviation of the obtained step difference image from the actual shape.

17. A method of inspection of a probe produced by a method as set forth in claim 12, comprising using said probe to scan a nanometer order step difference on a sample surface and finding a bearing of growth of the single wall carbon nanotube forming the sharp head of said probe based on an angle and bearing of deviation of the obtained step difference image from the actual shape.

* * * * *